(12) United States Patent
Kushnir

(10) Patent No.: US 7,293,812 B2
(45) Date of Patent: Nov. 13, 2007

(54) POWER DRIVEN GRIPPING DEVICE WITH VARIOUS CROSS-SECTIONS

(76) Inventor: Yakov Kushnir, 440 Neptune Ave. #10E, Brooklyn, NY (US) 11224

( * ) Notice: Subject to any disclaimer, the term of this patent is extended or adjusted under 35 U.S.C. 154(b) by 0 days.

(21) Appl. No.: 10/446,385

(22) Filed: May 29, 2003

(65) Prior Publication Data

US 2004/0239133 A1 Dec. 2, 2004

(51) Int. Cl.
*B25J 15/08* (2006.01)
(52) U.S. Cl. .......................... 294/106; 294/88
(58) Field of Classification Search ............... 294/88, 294/106, 115; 901/37; 269/32, 228; 414/555, 414/621, 739, 741
See application file for complete search history.

(56) References Cited

U.S. PATENT DOCUMENTS

| | | | | |
|---|---|---|---|---|
| 3,652,117 A | * | 3/1972 | Schroder | 294/106 |
| 4,133,570 A | * | 1/1979 | Hammink et al. | 294/110.1 |
| 4,303,269 A | * | 12/1981 | Faughnan | 294/88 |
| 4,304,433 A | * | 12/1981 | Langowski | 294/106 |
| 4,728,137 A | * | 3/1988 | Hamed et al. | 294/88 |
| 4,810,019 A | * | 3/1989 | Brucher | 294/106 |
| 5,118,248 A | * | 6/1992 | Brucher | 294/88 |
| 5,884,952 A | * | 3/1999 | Chadwick | 294/88 |
| 6,237,978 B1 | * | 5/2001 | Bliss | 294/88 |

\* cited by examiner

*Primary Examiner*—Saul Rodriguez
*Assistant Examiner*—Paul T Chin
(74) *Attorney, Agent, or Firm*—I. Zborovsky

(57) ABSTRACT

A gripping device has a holder, two gripping elements movable relative to one another between an inoperative position in which the gripping elements are distal from one another and an operative position in which the gripping elements are proximal to one another so as to grip an object located between them, two first and two second connecting elements each connecting a respective one of the gripping elements to the holder, each of the connecting element having a first end connected to the holder pivotally and connected with a respective one of the gripping elements pivotally, so that each of the gripping elements is turned about two axes to move between the operative and the inoperative positions.

9 Claims, 17 Drawing Sheets

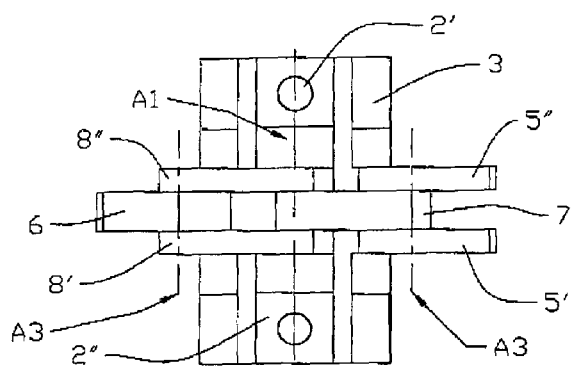
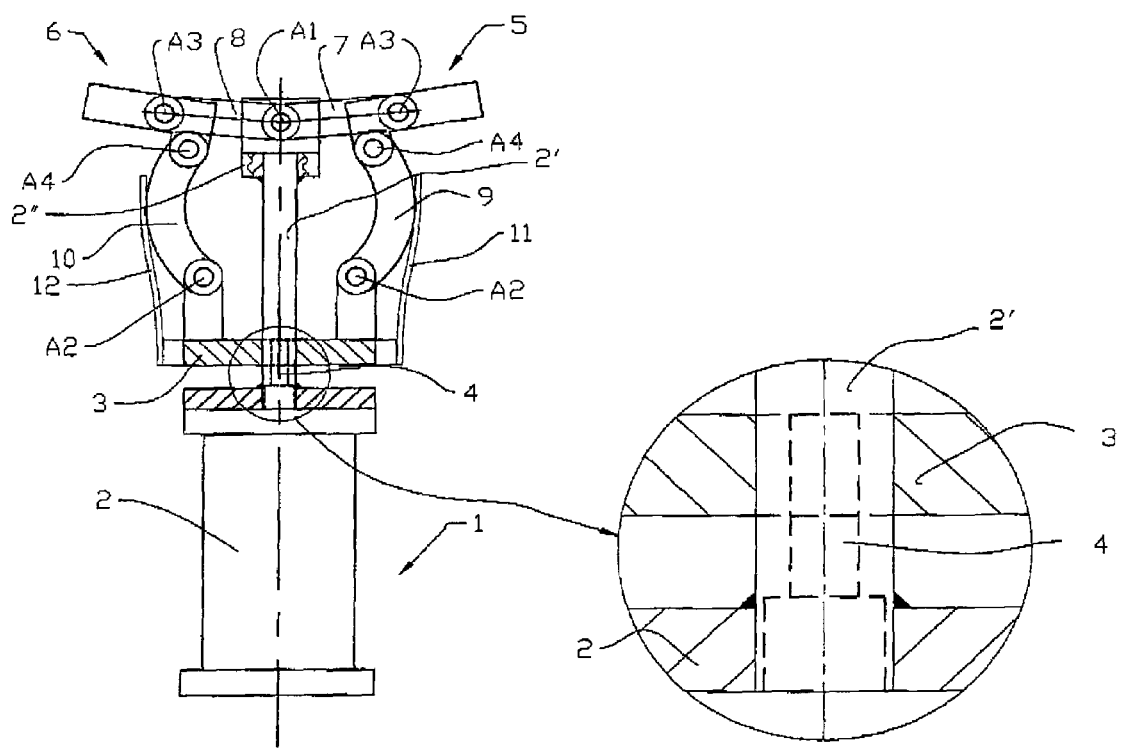
Fig. 3
Fig. 1

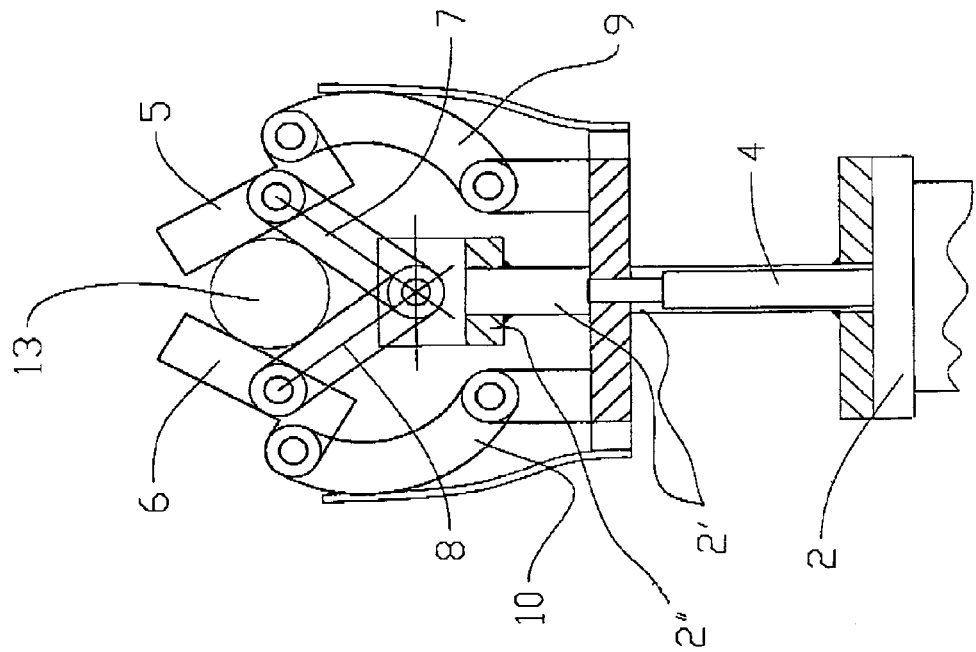
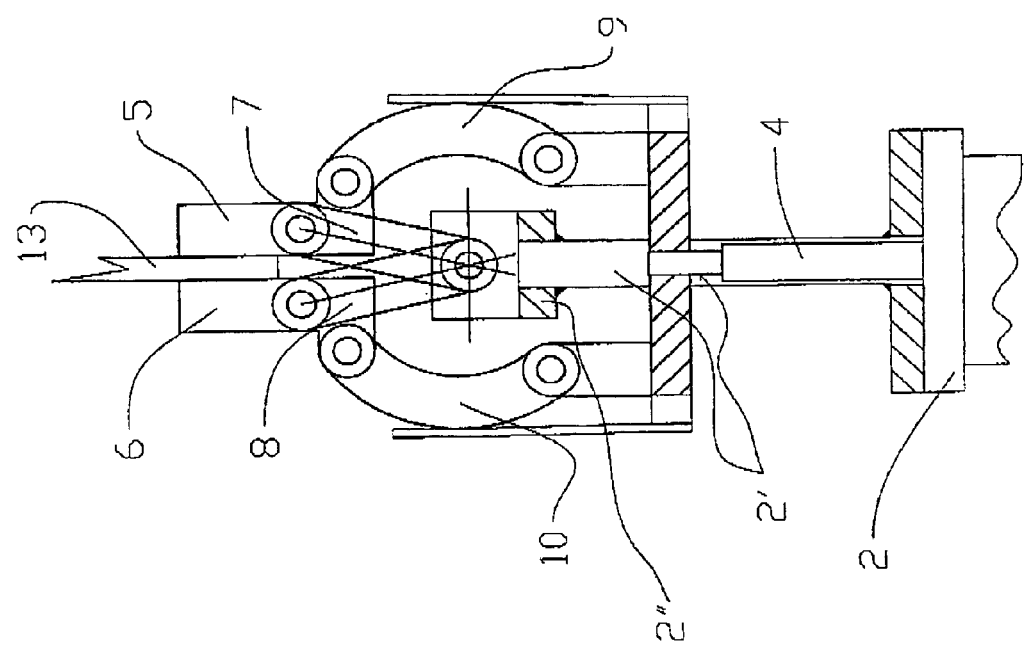

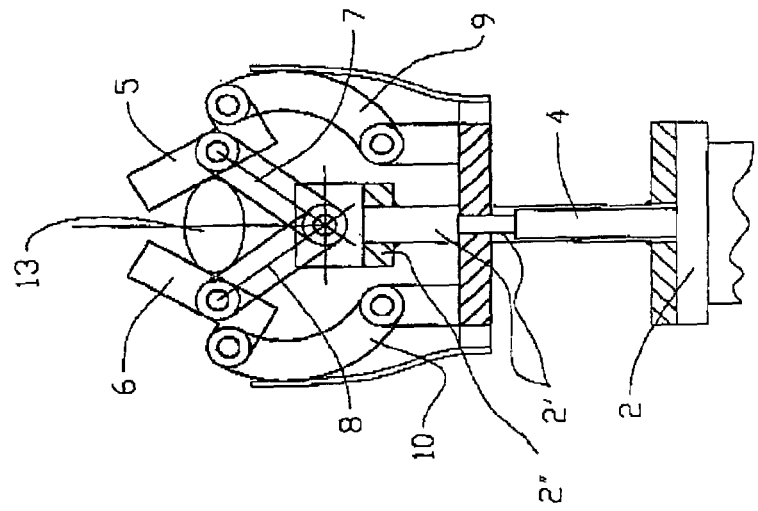
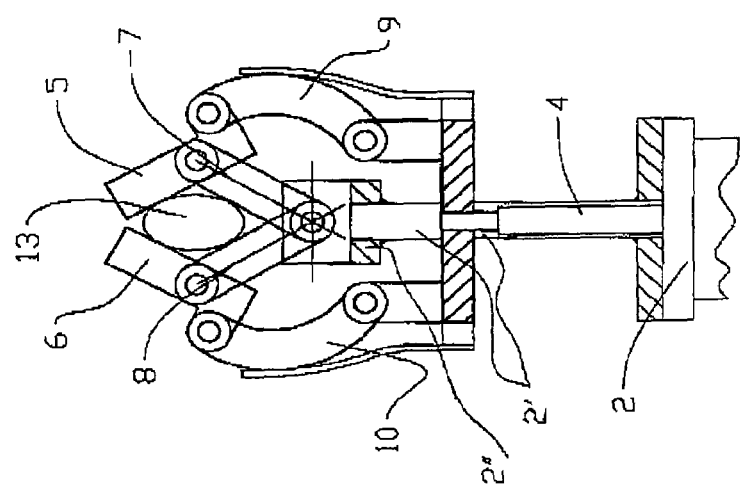
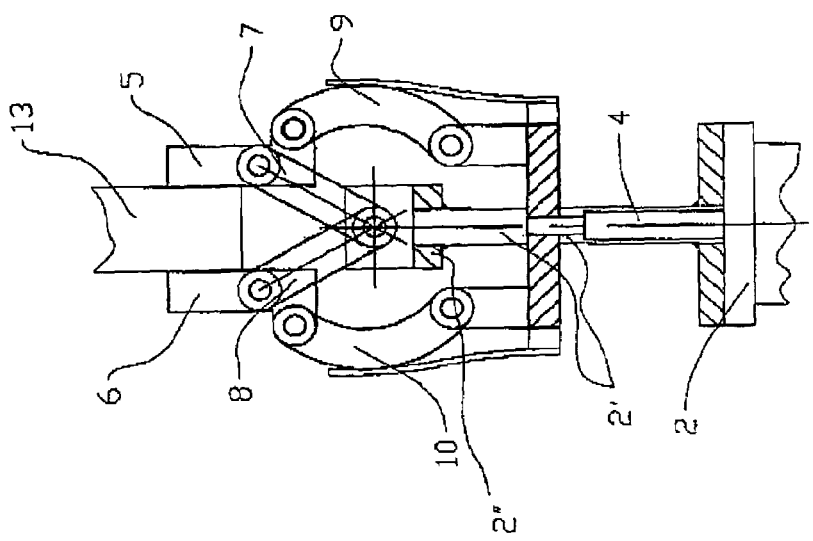

POWER DRIVEN GRIPPING DEVICE WITH VARIOUS CROSS-SECTIONS

BACKGROUND OF THE INVENTION

The present invention relates generally to gripping devices, or in other words to devices for gripping various objects such as pipes, rods, etc.

Gripping devices are known in the art. There are power-driven gripping devices which include gripping elements turnable by a power drive, such as for example pneumatic, electrical and other drives. The existing gripping devices have certain limitations in the sense that gripping elements of known gripping devices can grip objects within a narrow range of cross-sections. It is believed that the existing devices can be further improved.

SUMMARY OF THE INVENTION

Accordingly, it is an object of the present invention to provide an improved gripping device.

In keeping with these objects and with others which will become apparent hereinafter, one feature of the present invention resides, briefly stated, in a device for gripping objects, which has a holder; two gripping elements movable relative to one another between an inoperative position in which said gripping elements are distal from one another and an operative position in which said gripping elements are proximal to one another so as to grip an object located between them, two first connecting elements each connecting with a respective one gripping element with said holder; two second connecting elements each connecting a respective one of said gripping elements with said holder, each of said first connecting elements having a first end which is connected to said holder pivotally about a first pivot axis, each of said second connecting elements having a first end connected with said holder pivotally about a second axis, each of said first connecting elements having a second end connected with a respective one of said gripping elements pivotally about a third axis, each of said second connecting elements having a second end connected with a respective one of said gripping elements pivotally about a fourth axis which is spaced from said third axis, so that when each of said first and second connecting elements is turned about said first axis and said second axis correspondingly, each of said gripping elements is turned about said third axis and said fourth axis to move between said inoperative position and said operative position; and further comprising power drive means operative for turning said second connecting elements around said second axes.

When the device is designed in accordance with the present invention, a range of cross-sections of objects which can be gripped by the gripping device is significantly increased.

In accordance with another feature of the present invention, said first pivot axes of said first connecting elements coincide with one another.

In accordance with still a further feature of the present invention, said holder has an immovable part which defines said first axes of said first connecting elements, and a movable part which is movable relative to said immovable part by said power drive and defines said second axes of said second connecting elements.

In accordance with still a further feature of the invention, said power drive is immovably arranged in said immovable part of said holder, wherein said power drive includes two cylinder-piston units each having a cylinder and a piston movable in said cylinder and each forming a respective one of said second connecting elements, each of said cylinders being connected with said holder pivotally about said second axis, while each of said pistons has an end connected pivotally with a respective one of said gripping elements about said fourth axes. Each of said first, second, third and fourth axes can extend parallel to one another. Each of said gripping members can be formed as an angle having two legs, so that said third axis is located in one of said legs and said fourth axes is located in another of said legs of each of said angles.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view of a first embodiment of a gripping device in accordance with the present invention in an inoperative position;

FIG. 3 is a top view of the gripping device shown in FIG. 1;

DESCRIPTION OF THE PREFERRED EMBODIMENTS

Figure 2:
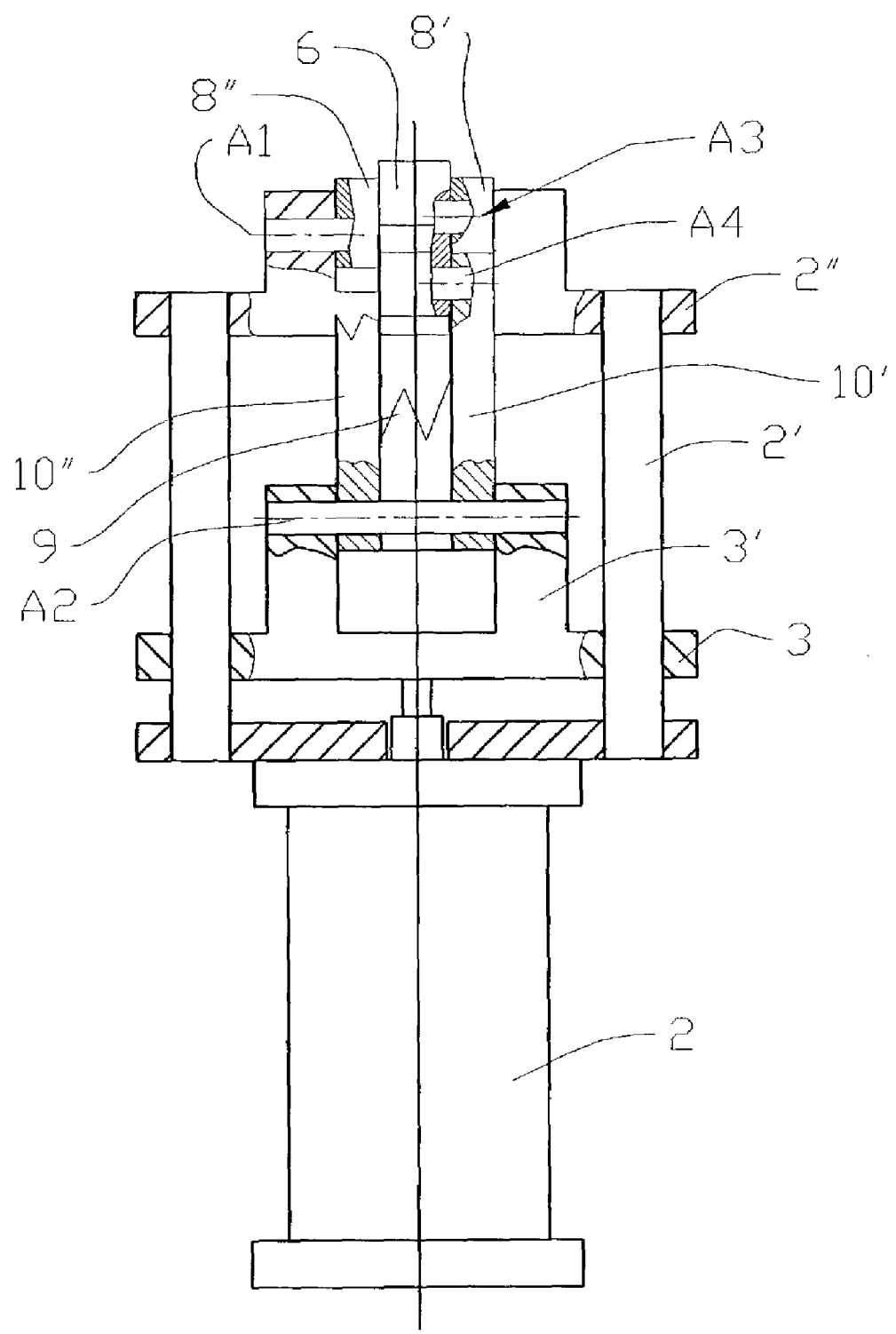
FIG. 2 is a side view of the gripping device shown in FIG. 1.

A gripping device in accordance with the present invention has a holder which is identified as a whole with reference numeral 1. In accordance with a first embodiment of the present invention the holder 1 has an immovable part 2 and a movable part 3 which is a movable relative to the immovable part by drive means, formed for example as a pneumatic cylinder-piston unit. It is to be understood that the drive means can be also hydraulic, electrical, etc. A cylinder of the cylinder-piston unit can form the immovable part 2, or it can be located in the immovable part 2. A piston of the cylinder-piston unit has a piston rod 4 which is fixedly connected with the movable part 3 so that during the displacement of the piston in the cylinder under the action of a power fluid the movable part 3 of the holder 1 is displaced relative to the immovable part 2.

The device further has two gripping elements which are identified with reference numerals 5 and 6. In accordance with the present invention the device further has two first connecting elements 7 and 8 and two second connecting elements 9 and 10. The first connecting element 7 connects the gripping element 5 and the second connecting element 8 connects the gripping element 6 with the immovable part 2 of the holder 1, while the second connecting element 9 connects the gripping element 5 and the second connecting element 10 connects the gripping element 6 with the movable part 3 of the holder 1. The connecting elements 7 and 8 have first ends which are connected with the immovable part 2 of the holder 1 pivotally about a first axes A1. The connecting elements 9 and 10 also have first ends which are connected to the movable part 3 of the holder 1 pivotally about second axes A2.

In the shown embodiment the axes A1 about which the first ends of the first connecting elements 7 and 8 turn coincide with one another, while the axes A2 about which the first ends of the connecting elements 9 and 10 turn are spaced from one another in a transverse direction.

The second ends of the first connecting elements 7 and 8 are connected with the gripping elements 5 and 6 pivotally about third axes A3. The second ends of the connecting elements 9 and 10 are connected with the gripping elements 5 and 6 pivotally about fourth axes A4. Each axes A3 is spaced from each axes A4. In this embodiment each gripping element 5 and 6 is formed as an angular element having two legs, so that axis A3 is located in one leg while the axis A4 is located in the other leg of each angular element.

As shown in the top view of FIG. 3 the gripping element 5 is formed as a single element, while the gripping element 5 is composed of two gripping members 5' and 5" which are axially spaced from one another, and at the same time the first connecting element 8 is composed of two connecting members 8' and 8", while the first connecting element 7 is formed as a single element in order to provide an alternating axial arrangement of the corresponding elements of the corresponding parts 5', 7, 5" and 8', 6, 8" and to enable to provide the above mentioned pivotal connections.

As can be seen on the side view of FIG. 2, a lower portion of the immovable part 2 of the holder 1 is connected by columns 2' with an upper portion 2" which defines the axes A1. The movable part 3 of the holder 1 in addition to a lower part has upwardly extending projections 3' which define the axes A2.

Two side springs 11 and 12 formed as springy tongues are fixedly connected each with one end to the movable part 3 of the holder and laterally abut against outer surfaces of the second connecting elements 9 and 10 to urge them toward one another and to retain the whole device in a certain position, for example in such a position, in which the gripping elements 5 and 6 are not completely spread apart by a significant distance as shown in FIG. 1 but assume an intermediate position which is also an inoperative position.

Figure 4:
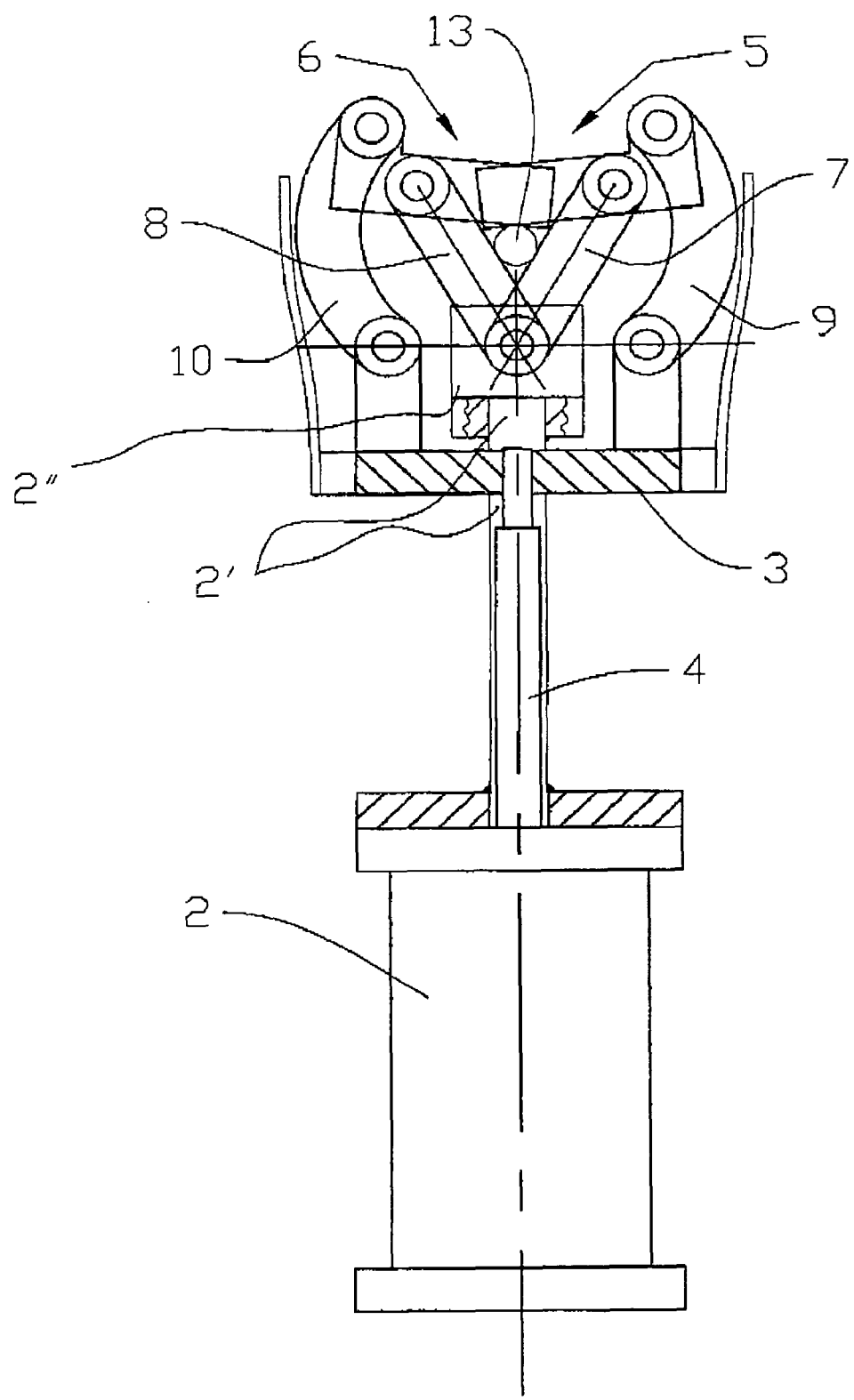
FIG. 4 is a view showing the gripping device of FIG. 1 in an operative position in which it grips various objects.
Figure 5:
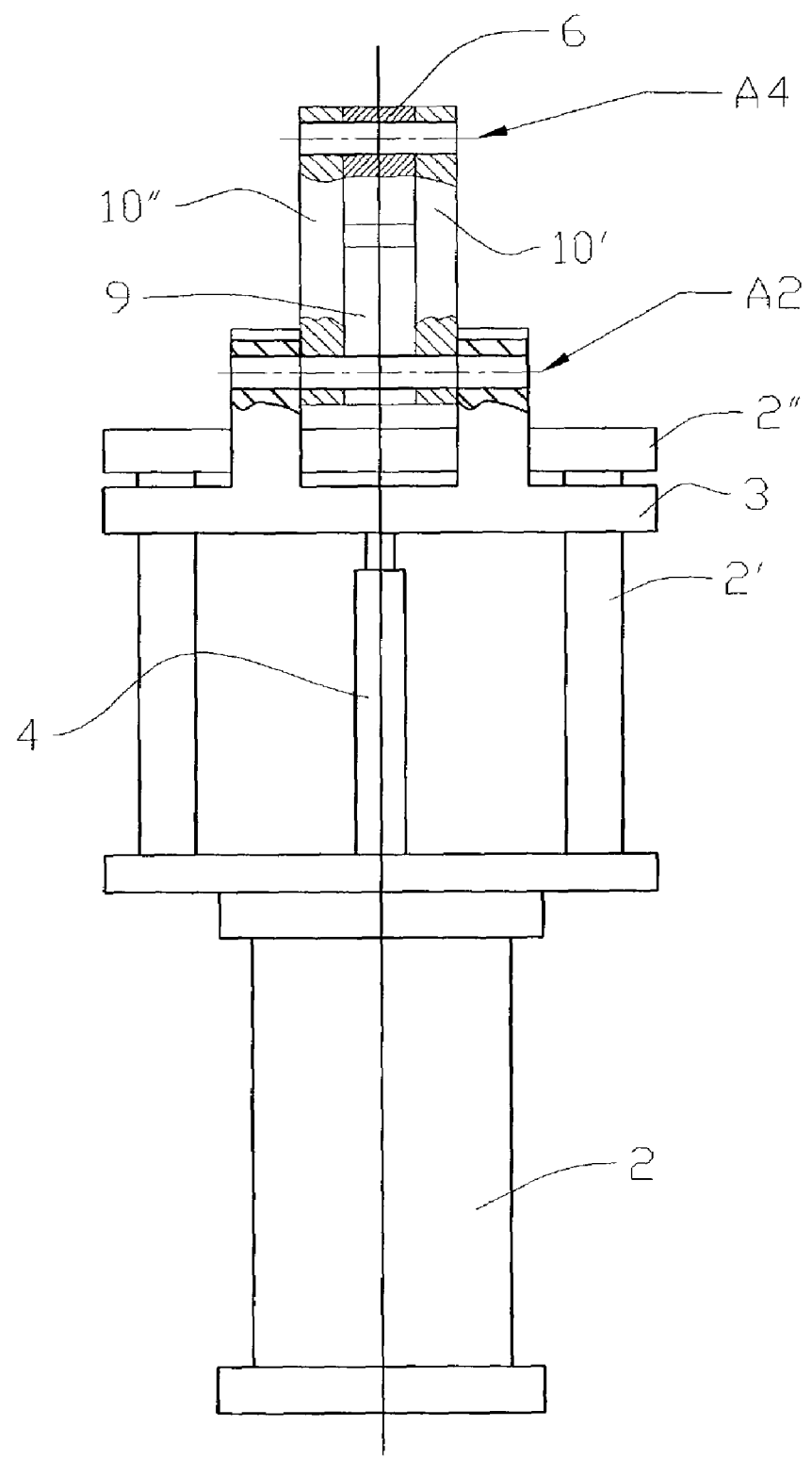
FIG. 5 is a side view of the gripping device shown in FIG. 4.
Figure 7:
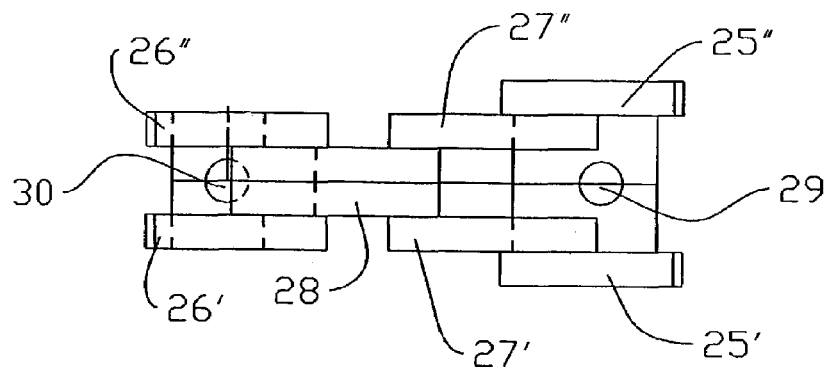
FIG. 7 is a top view of the gripping device shown in FIG. 6.
Figure 6:
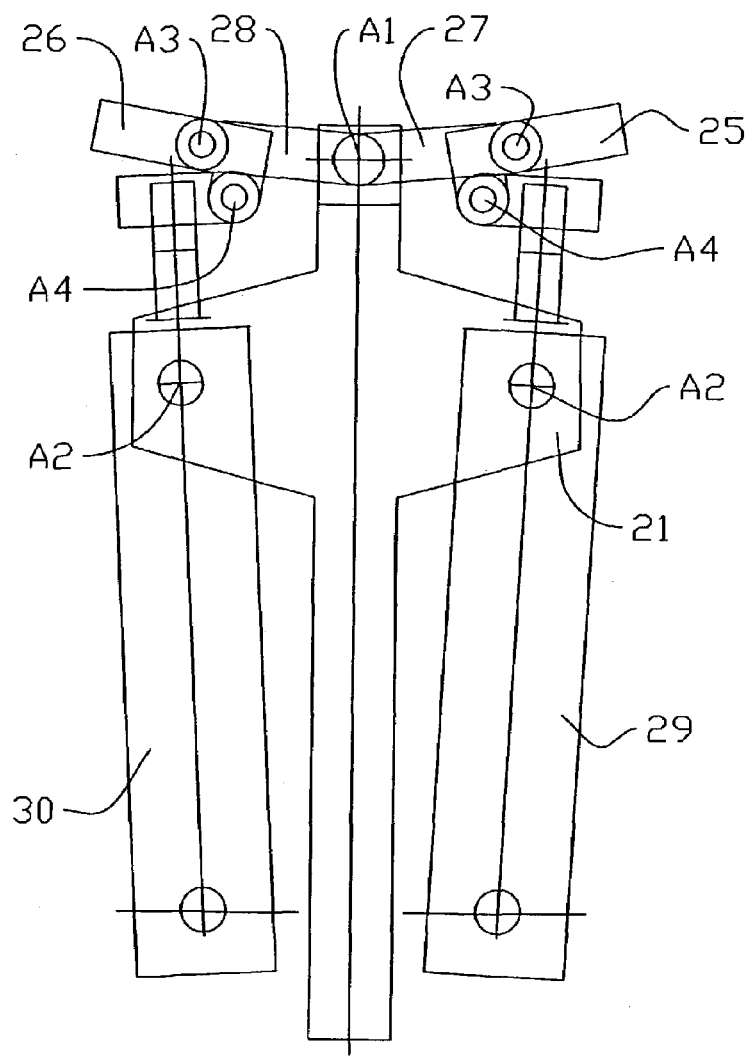
FIG. 6 is a front view of a gripping device in accordance with another embodiment of the present invention in an inoperative position.
Figure 7:
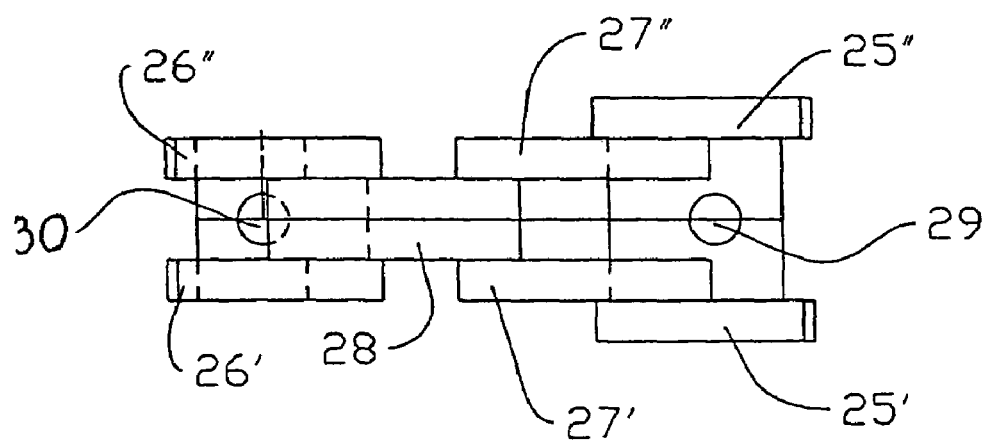
Figure 8:
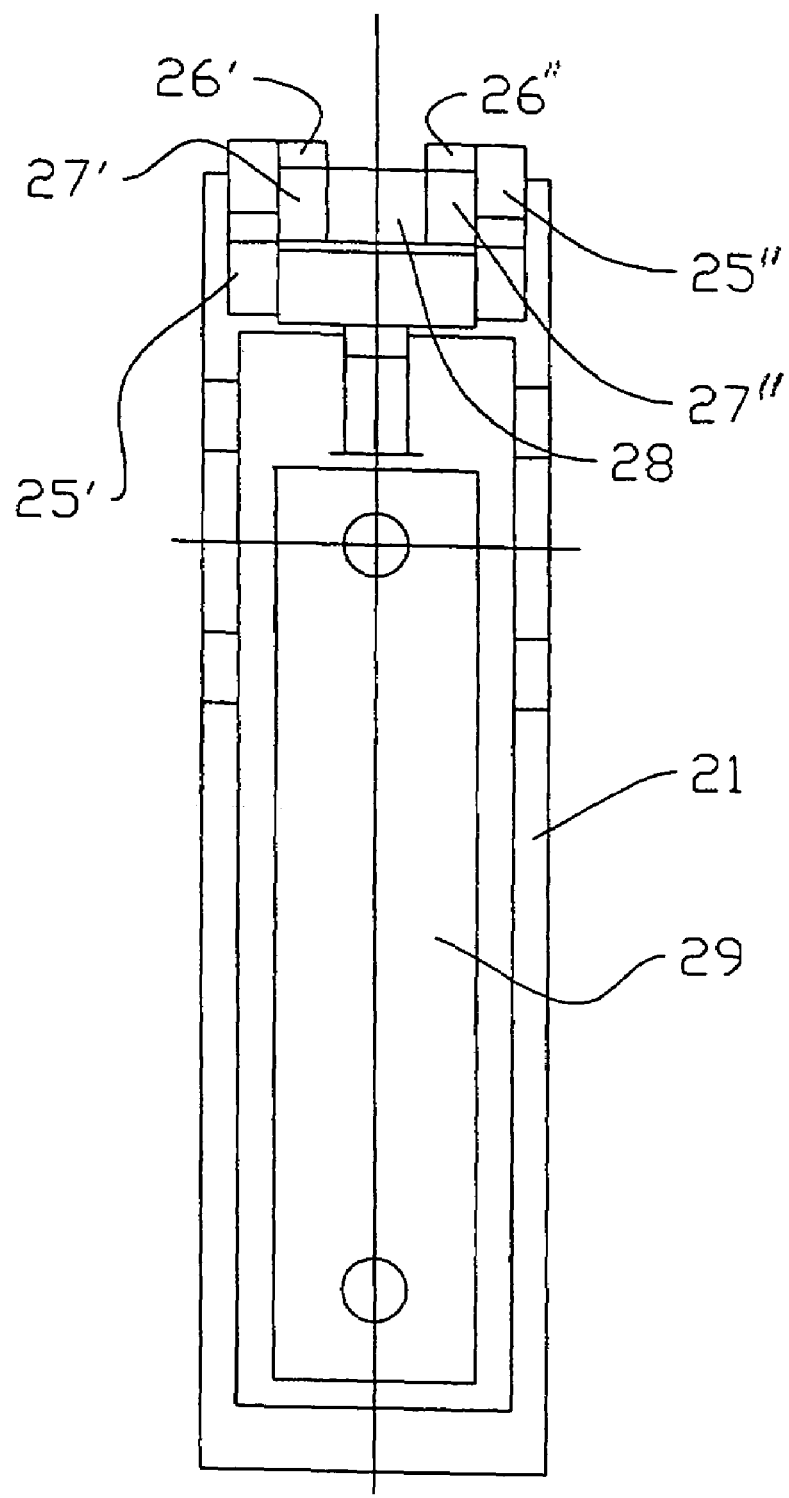
FIG. 8 is a side view of the gripping device shown in FIG. 6.
Figure 10:
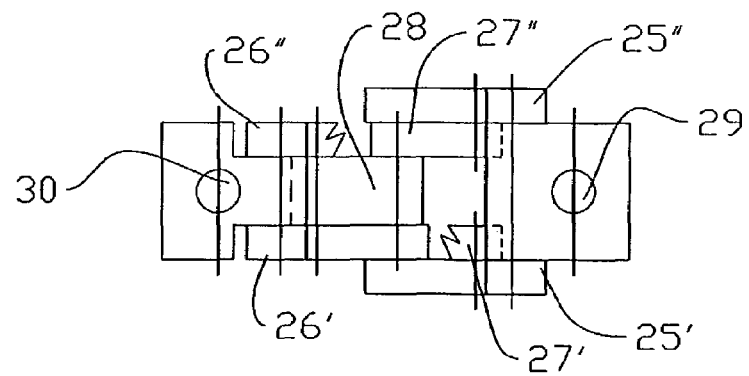
FIG. 10 is a top view of the gripping device of FIG. 9.

When the movable part 3 of the holder is displaced by the drive means upwardly relative to the immovable part 2 of the same, the connecting elements 9 and 10 turn about their axes A2, the connecting elements 7 and 8 turn about their axes A1, while the gripping elements 5 and 6 turn about their axes A3 and A4 to assume a gripping position and to grip an object. In FIG. 4a it is shown how the gripping elements 5 and 6 grip a flat elongated element 13. In FIG. 4b it is shown how a tubular object 13' is gripped by the gripping elements 5 and 6. It is therefore believed to be clear that the gripping device of the present invention can grip elements having significantly different cross-sectional sizes.

FIGS. 4c, 4d, 4e illustrate the gripping device which grips other objects.

FIGS. 6-10 show another embodiment of the present invention.

The device shown in these figures of the drawings has a holder which is identified with reference numeral 21. It also has two gripping elements 25 and 26, two first connecting elements 27 and 28 and two second connecting elements 29 and 30. One end of each of the first connecting elements 27 and 28 is connected with the holder 21 pivotally about an axes A1 and the axes A1 of the first connecting elements 27, 28 coincide with one another. One end or any part of each of the second connecting elements 29 and 30 is connected to the holder 21 pivotally about the axes A2. The other end of each of the first connecting elements 27 and 28 is connected to the gripping element 25 and 26 pivotally about an axis A3, while the other end of each of the second connecting elements 29 and 30 is connected to the corresponding gripping element 25 and 26 pivotally about an axis A4.

In this embodiment the second connecting elements 29 and 30 are formed as cylinder-piston units. In each cylinder-piston unit the cylinder is connected to the holder 21 pivotally about the axis A2, while the piston, directly or through an additional element is connected to the gripping element 25 and 26 pivotally about the axis A4.

Figure 9:
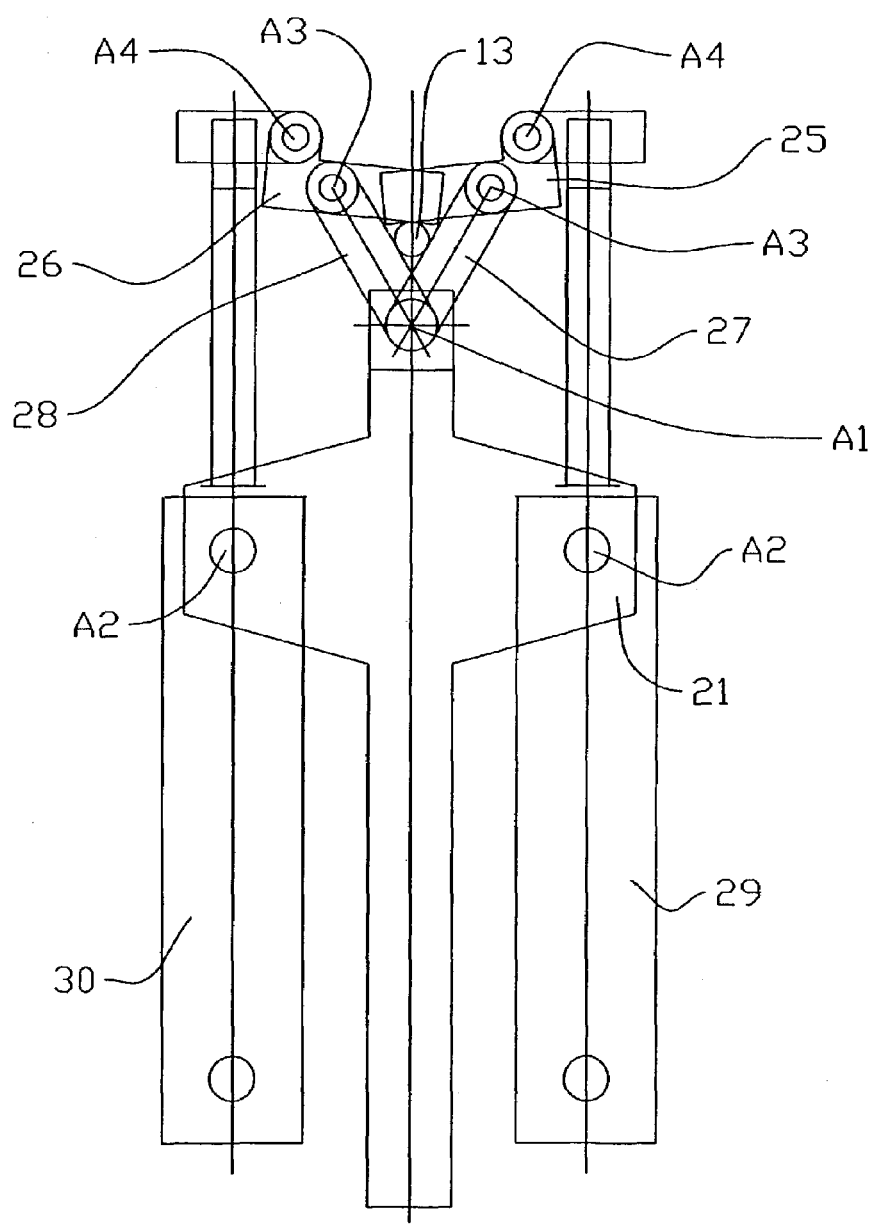
FIG. 9 is a view showing the gripping device of FIG. 6 in an operative position.
Figure 9A:
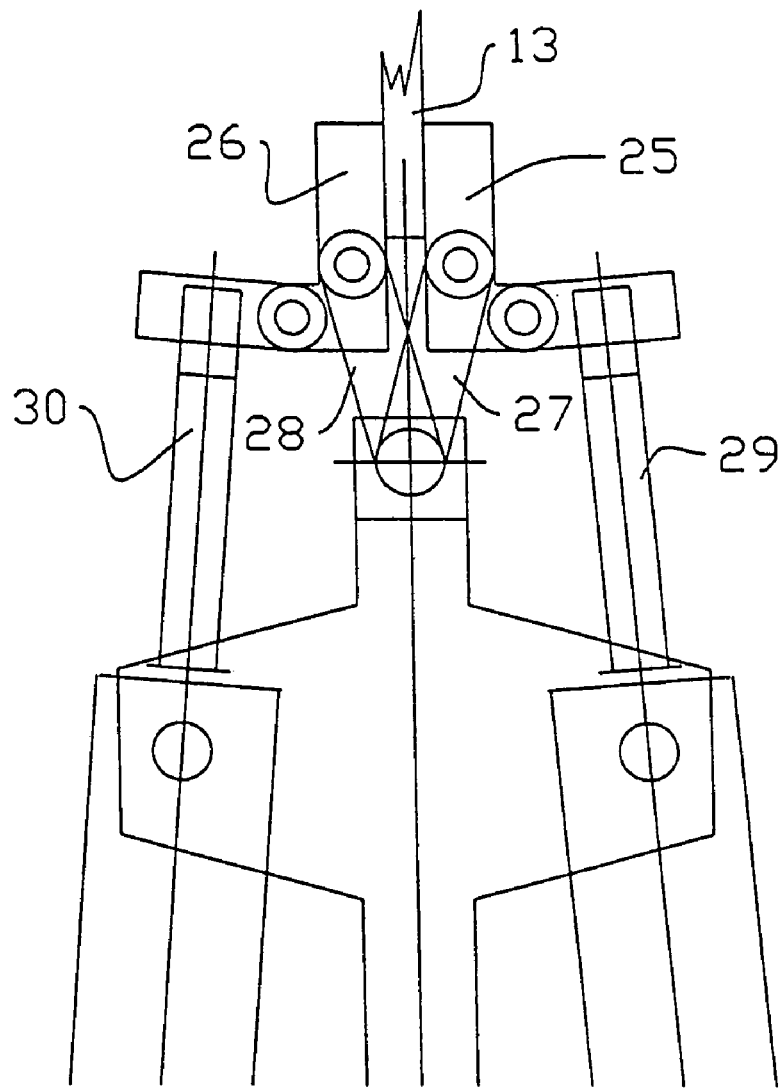
Figure 9A:
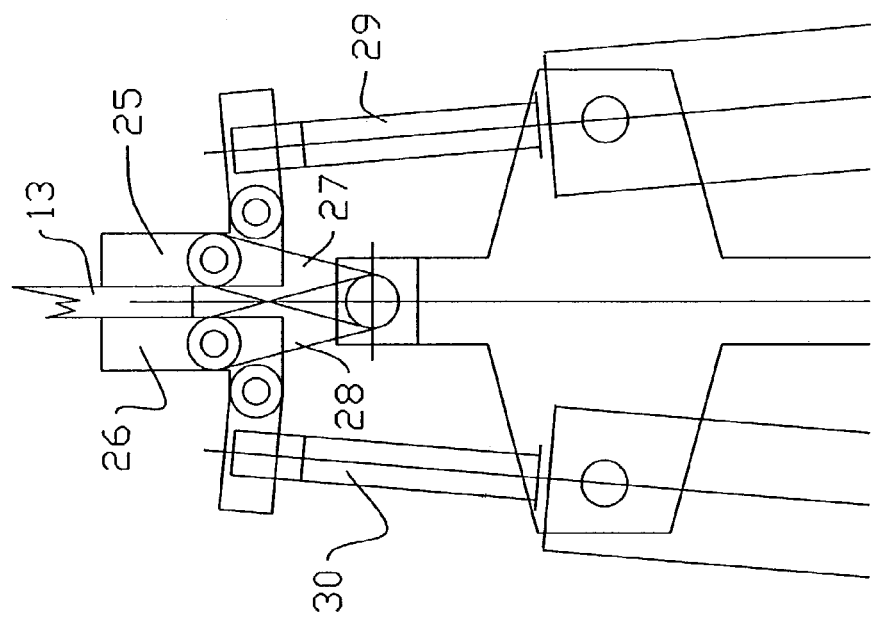
Figure 9B:
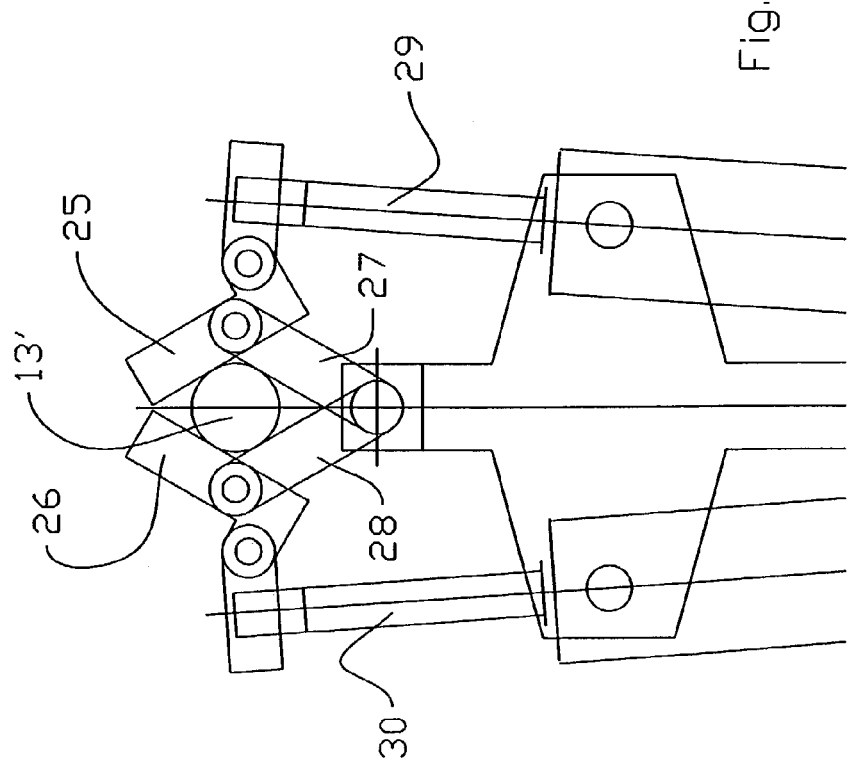
Figure 10:
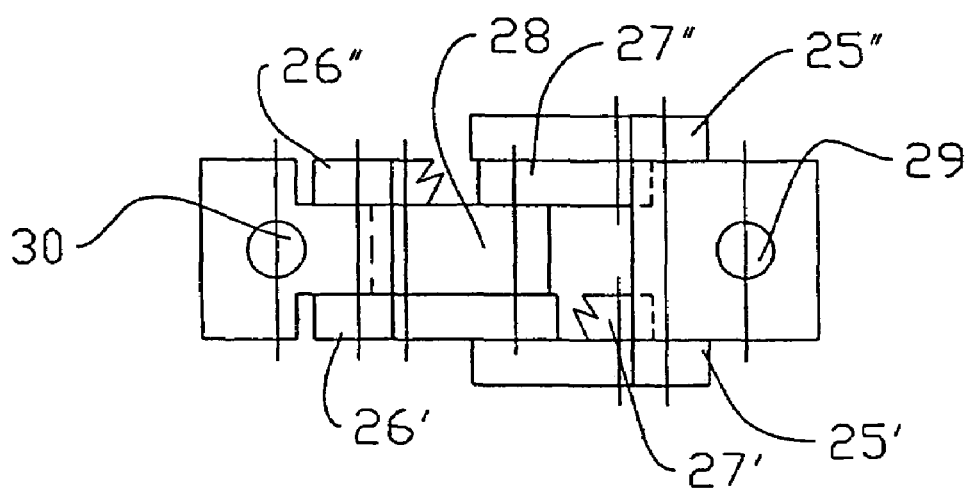
Figure 11:
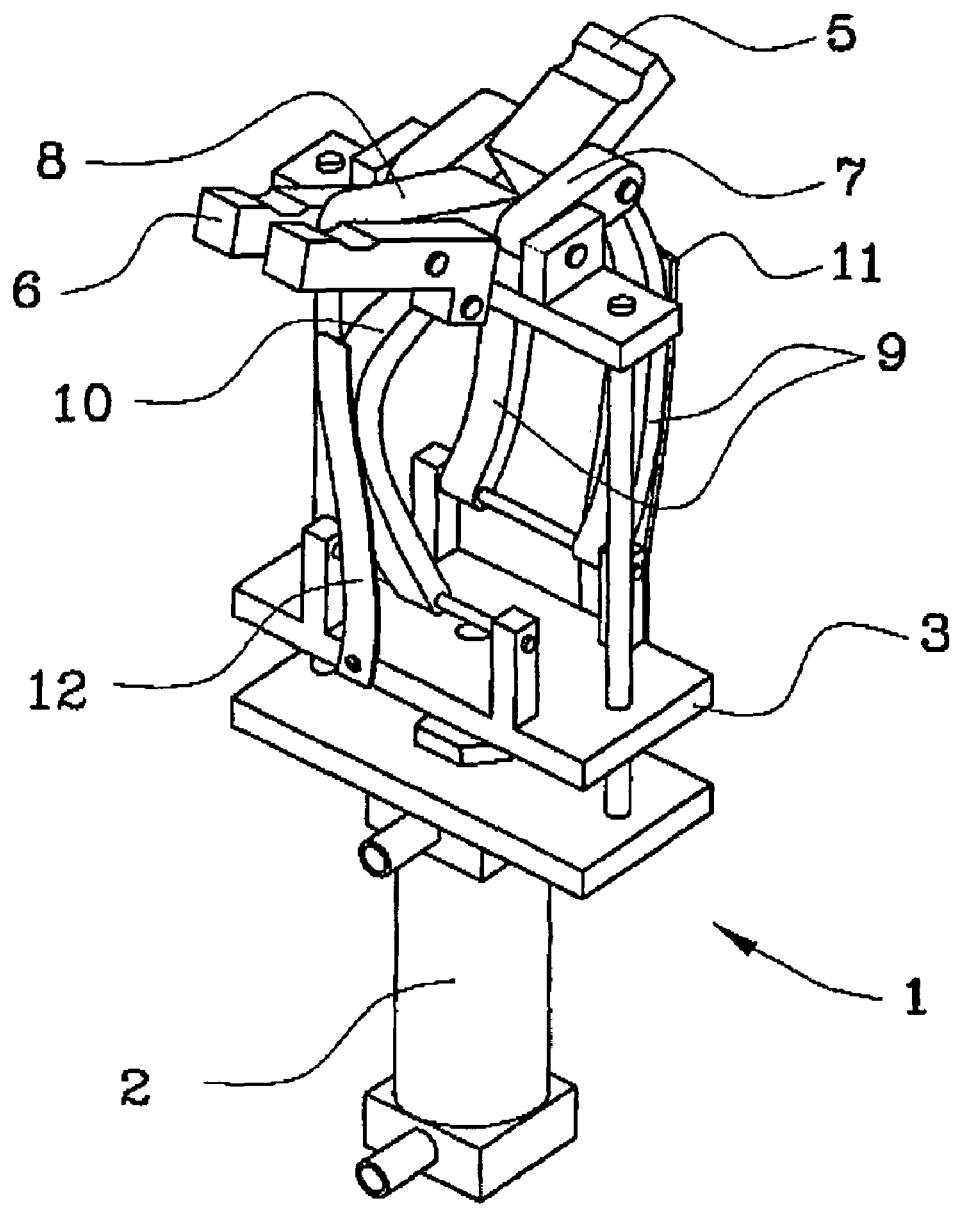
FIGS. 11-14 are perspective views of the inventive device In different positions.
Figure 12:
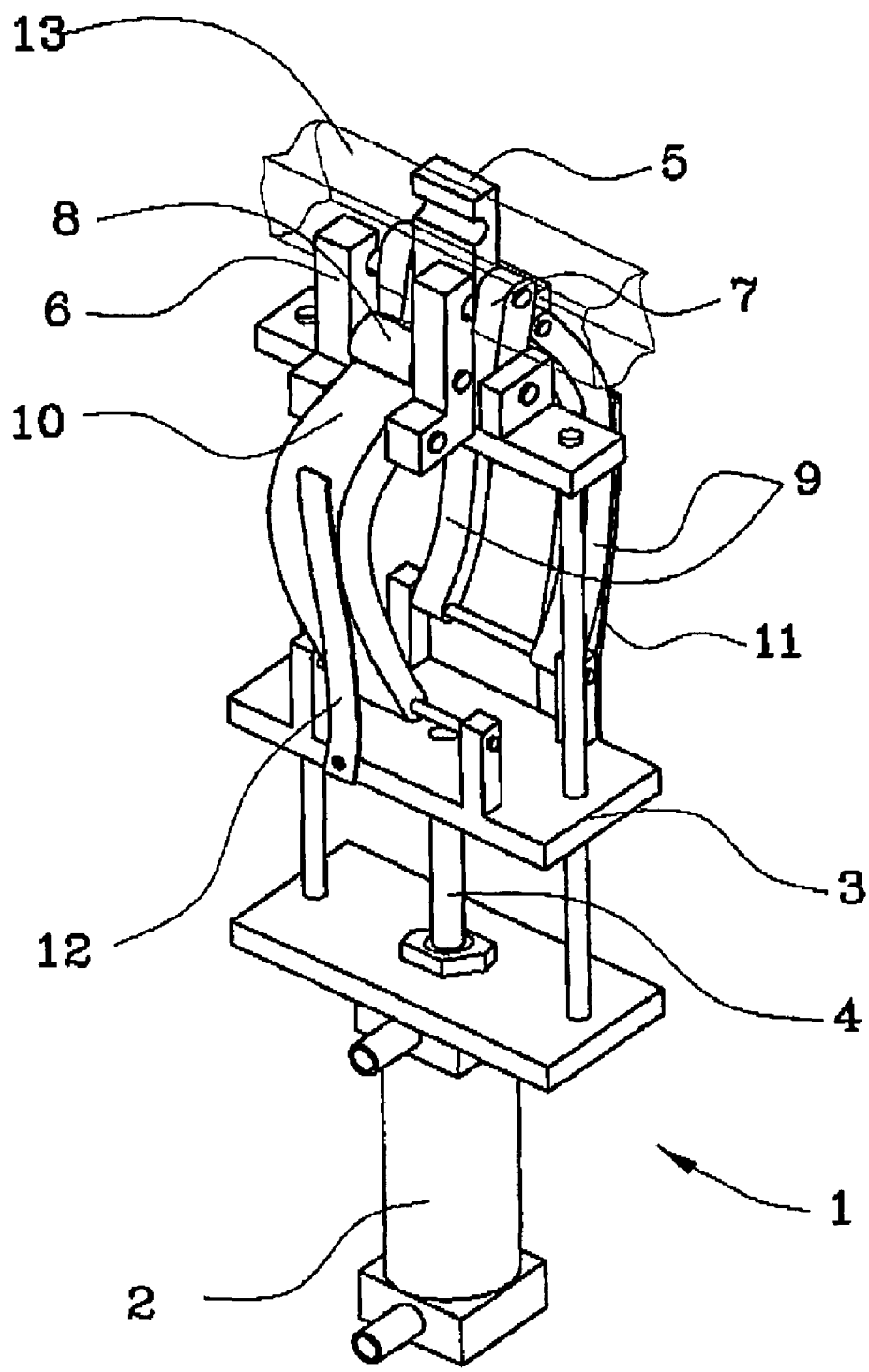
Figure 13:
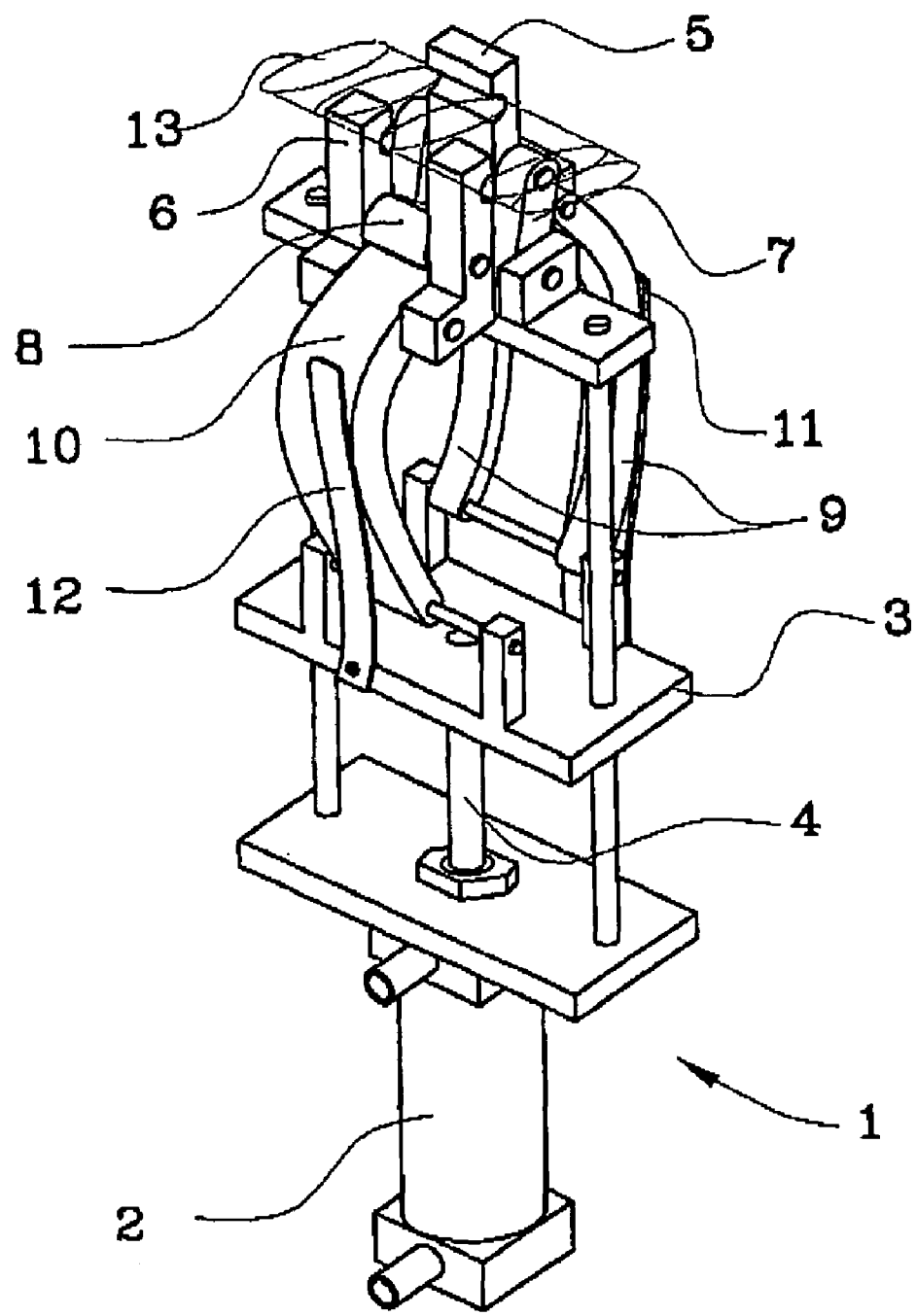
Figure 14:
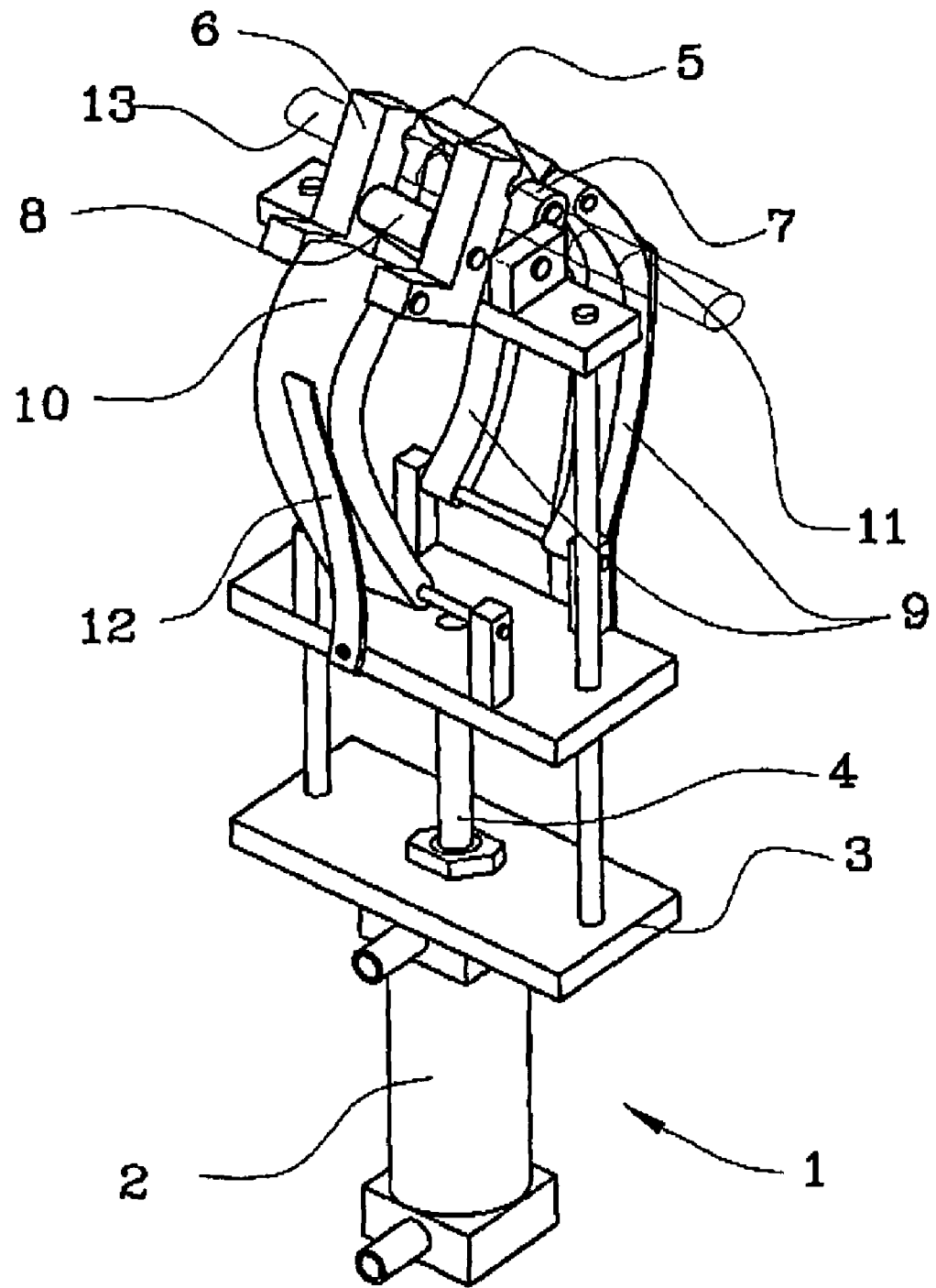

When the pistons of the cylinder-piston units 29 and 30 are extended and a flat object 13 has to be clamped, the second connecting elements 29 and 30 turn about their axes A2, the first connecting elements 27 and 28 turn about their axes A1, and the gripping elements 25 and 26 are turned about their axes A3 and A4. If an object to be grasped is a flat object as shown in FIG. 9a, the gripping elements 25 and 26 grasp this object in a position shown in this Figure. If however the object 13 has a different cross-section, for example a pipe shown in FIG. 9b, the gripping elements 25 and 26 assume somewhat different position and nevertheless also grasp the object 13'.

It is believed to be clear that the gripping elements 5, 6 and 25, 26 as well as the connecting elements 7, 8, 27, 28 can be formed in a different manner, not necessarily to be formed as angles. They can be formed as elements having different shapes.

It will be understood that each of the elements described above, or two or more together, may also find a useful application in other types of constructions differing from the types described above.

While the invention has been illustrated and described as embodied in gripping device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A gripping device, comprising:
a holder having a movable assembly and an immovable assembly,
said immovable assembly comprises a support body, a fixed upper member, and a column with two ends wherein one end of the column being connected to said upper member and the other end being connected to said support body;

said movable assembly further comprises a supporting member, at least two opposing gripping elements, at least two opposing first connecting elements, at least two opposing second connecting elements, said at least two gripping elements movable relative to one another between an inoperative position in which said gripping elements are distal from one another and an operative position in which said gripping elements are proximal to one another so as to grip an object located between them;

said at least two first connecting elements, each having a first end and a second end, and each first end of each first connecting element being pivotally connected to said upper member about a first pivot axis and each second end of each first connecting element being pivotally connected to each respective gripping element about a third pivot axis.

said at least two second connecting elements, each having a first end and a second end, each first end of each second connecting element being pivotally connected to said vertically movable member about a second pivot axis, and each second end of each second connecting element being pivotally connected to each respective gripping element about a fourth pivot axis, wherein each of said first and second connecting elements is turned about said first pivot axis and said second pivot axis correspondingly each of said gripping elements is turned about said third pivot axis and said pivot fourth axis to move between said inoperative position and said operative; and power drive means operative for turning said second connecting elements around said second pivot axes, wherein the gripping device consists of ten movable elements including said supporting member, three gripping elements, three first connecting elements, three second connecting elements, and wherein said pivot axes consist of seven pivot axes including one first pivot axis, two second pivot axes, two third pivot axes, and two fourth pivot axes.

2. The gripping device as defined in claim 1, wherein said first pivot axes of said first connecting elements coincide with one another.

3. The gripping device as claimed in claim 1, wherein said upper member of said immovable assembly defines said first axes of said drive means, and said supporting member defines said second axes of said second connecting elements.

4. The gripping device as defined in claim 1, wherein said power drive means is arranged in said support body.

5. The gripping device as defined in claim 1, wherein said first, second, third and fourth axes extend parallel to one another.

6. The gripping device as defined in claim 1, wherein each of said gripping members is formed as an angle having two legs, so that each third axis is located in one of the said legs of each of said angles.

7. The gripping device as defined in claim 1, and further comprising spring means including two spring elements each cooperating with a respective one of said second connecting elements and urging them toward one another.

8. The gripping device as defined in claim 1, wherein one of said gripping elements includes two gripping members spaced from one another in an axial direction, while the other of said gripping elements is formed as a single gripping member with an axial dimension which does not exceed an axial space between said gripping members of said one gripping element.

9. The gripping device as defined in claim 1, wherein said first connecting elements are directly pivotally connected to said gripping elements, so that an object can be gripped by said two gripping elements, or by said two gripping elements and said first connecting elements, or by said two gripping elements and one of said first connecting elements.

* * * * *